US012597268B2

(12) United States Patent
Lee et al.

(10) Patent No.: US 12,597,268 B2
(45) Date of Patent: Apr. 7, 2026

(54) METHOD AND DEVICE FOR DETERMINING LANE OF TRAVELING VEHICLE BY USING ARTIFICIAL NEURAL NETWORK, AND NAVIGATION DEVICE INCLUDING SAME

(71) Applicant: 42DOT INC., Seoul (KR)

(72) Inventors: Seung Jae Lee, Hwaseong (KR); Aidyn Zhakatayev, Seoul (KR); Seong Gyun Jeong, Seongnam (KR)

(73) Assignee: 42DOT INC., Seoul (KR)

( * ) Notice: Subject to any disclaimer, the term of this patent is extended or adjusted under 35 U.S.C. 154(b) by 556 days.

(21) Appl. No.: 18/044,381

(22) PCT Filed: Sep. 7, 2021

(86) PCT No.: PCT/KR2021/012169
§ 371 (c)(1),
(2) Date: Mar. 8, 2023

(87) PCT Pub. No.: WO2022/055231
PCT Pub. Date: Mar. 17, 2022

(65) Prior Publication Data
US 2023/0326219 A1 Oct. 12, 2023

(30) Foreign Application Priority Data
Sep. 8, 2020 (KR) ........................ 10-2020-0114794

(51) Int. Cl.
*G06V 20/56* (2022.01)
*G01C 21/36* (2006.01)
(Continued)

(52) U.S. Cl.
CPC ....... *G06V 20/588* (2022.01); *G01C 21/3602* (2013.01); *G06V 10/774* (2022.01);
(Continued)

(58) Field of Classification Search
CPC ............ G01C 21/3602; G01C 21/3647; G01C 21/3658; G06V 10/454; G06V 10/774;
(Continued)

(56) References Cited

U.S. PATENT DOCUMENTS

| | | | | |
|---|---|---|---|---|
| 11,592,827 B1 * | 2/2023 | Lam | .................. | B60W 30/0956 |
| 2016/0034495 A1 * | 2/2016 | Yano | ................... | G01C 21/3859 |
| | | | | 707/695 |

(Continued)

FOREIGN PATENT DOCUMENTS

| | | | | |
|---|---|---|---|---|
| CN | 102416953 | * | 4/2012 | ............ B60W 30/12 |
| CN | 111391848 | * | 7/2020 | ...... B60W 30/18163 |

(Continued)

OTHER PUBLICATIONS

Autonomous Driving Strategy using Deep Neural Network. International Search Report.

*Primary Examiner* — Zhiyu Lu
(74) *Attorney, Agent, or Firm* — Harvest IP Law, LLP

(57) ABSTRACT

An embodiment provides a lane determination apparatus for a driven vehicle using an artificial neural network comprising an image information collection module configured to acquire driving image information of a vehicle from at least one camera module installed in the vehicle, a pre-trained lane prediction artificial neural network module, with the driving image information as input information and with lane prediction information of the vehicle and confidence information for the lane prediction information as output information, an output information distribution calculation module configured to calculate a data distribution map of the output information to thereby generate a first data distribution map, a reference information distribution calculation module configured to collect reference information for actual traveling lane prediction information of the vehicle, to calculate a data distribution map of the reference informa- (Continued)

tion, and to thereby generate a second data distribution map and a confidence calibration module configured to update parameters of the artificial neural network module so as to reduce a difference between the first data distribution map and the second data distribution map based on the second data distribution map.

9 Claims, 19 Drawing Sheets

(51) Int. Cl.
| | |
|---|---|
| *G06V 10/774* | (2022.01) |
| *G06V 10/776* | (2022.01) |
| *G06V 10/82* | (2022.01) |
| *G08G 1/16* | (2006.01) |

(52) U.S. Cl.
CPC ............ *G06V 10/776* (2022.01); *G06V 10/82* (2022.01); *G08G 1/167* (2013.01)

(58) Field of Classification Search
CPC .... G06V 10/776; G06V 10/82; G06V 20/588; G08G 1/167
See application file for complete search history.

(56) References Cited

U.S. PATENT DOCUMENTS

| | | | |
|---|---|---|---|
| 2018/0307930 A1* | 10/2018 | Mittal ................. | G06V 20/588 |
| 2020/0172093 A1* | 6/2020 | Kum ................. | B60W 30/0956 |
| 2021/0181738 A1* | 6/2021 | Jiang ......................... | G06T 7/35 |

FOREIGN PATENT DOCUMENTS

| | | | | |
|---|---|---|---|---|
| JP | 2006298041 A | 11/2006 | | |
| JP | 2017-162438 A | 9/2017 | | |
| JP | 2019-194751 A | 11/2019 | | |
| JP | 2020-064046 A | 4/2020 | | |
| KR | 20140104516 A | 8/2014 | | |
| KR | 101503473 B1 | 3/2015 | | |
| KR | 101749873 B1 | 6/2017 | | |
| WO | WO-2021189210 A1* | 9/2021 | ............ | B60W 40/02 |

* cited by examiner

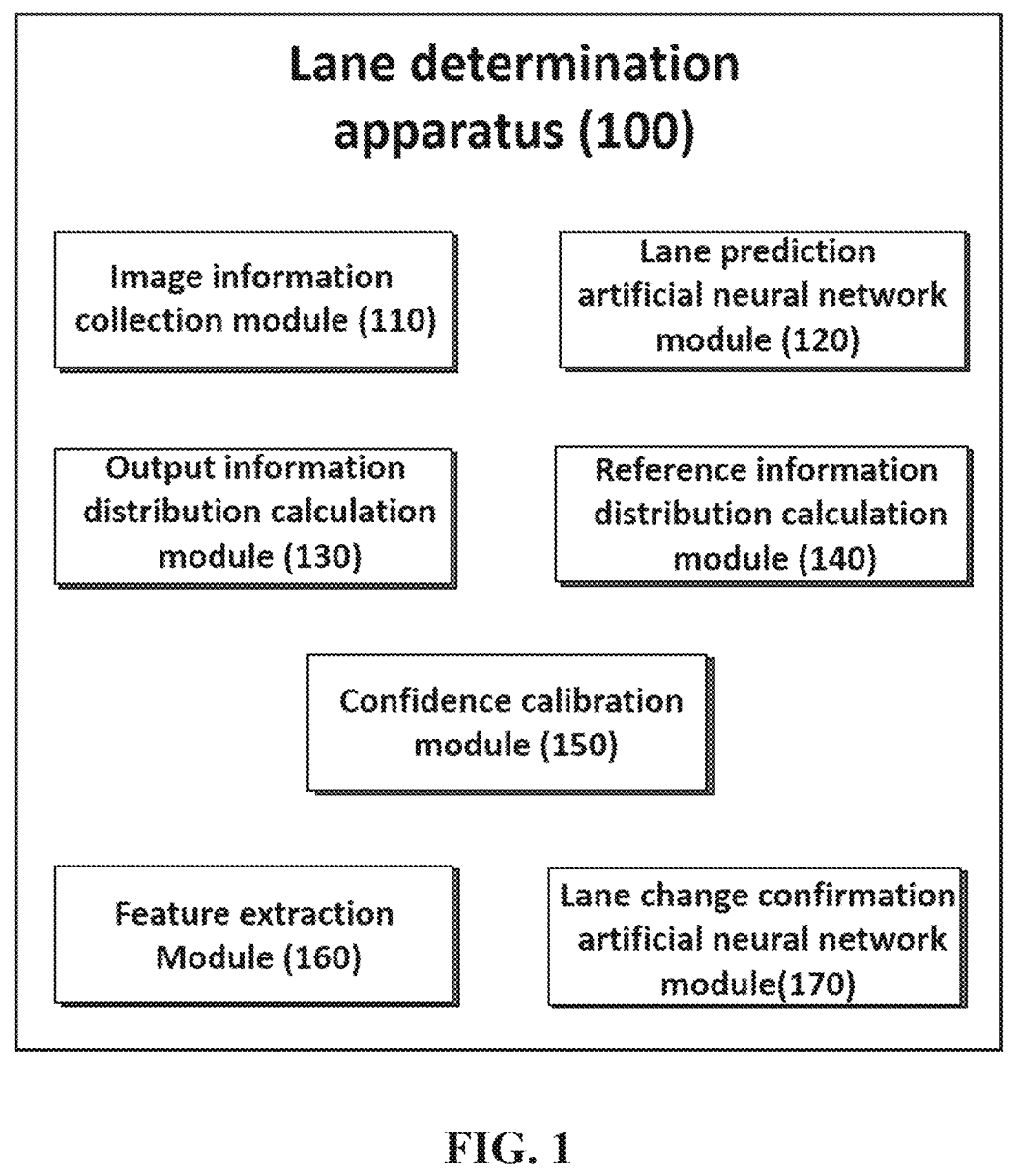

Lane determination apparatus (100)

Image information collection module (110)

Lane prediction artificial neural network module (120)

Output information distribution calculation module (130)

Reference information distribution calculation module (140)

Confidence calibration module (150)

Feature extraction Module (160)

Lane change confirmation artificial neural network module(170)

FIG. 1

```
import tensorflow as tf
import numpy as np z = [1,2,3,4,5,6]

def softmax(a) :
    c = np.max(a)
    exp_a = np.exp(a-c)
    sum_exp_a = np.sum(exp_a)
    y = exp_a / sum_exp_a
    return y q = softmax(z)
```

FIG. 7A

```
def softmax_with_temperature(z, T) :
    z = np.array(z)
    z = z / T
    max_z = np.max(z)
    exp_z = np.exp(z-max_z)
    sum_exp_z = np.sum(exp_z)
    y = exp_z / sum_exp_z
    return y calibrated_q2 = softmax_with_temperature(z, 2)
calibrated_q10 = softmax_with_temperature(z, 10)
```

FIG. 7B

Lane-varying point

Lane merging point

Obstacle presence point

Lane expansion point

Intersection point

Construction point

Output result at the lane expansion point
in the case of not including the exception class Output result at the lane expansion point
in the case of including the exception class Output result at the obstacle-present point
in the case of not including the exception class Output result at the obstacle-present point
in the case of including the exception class Output result at the intersection point
in the case of not including the exception class Output result at the intersection point
in the case of including the exception class

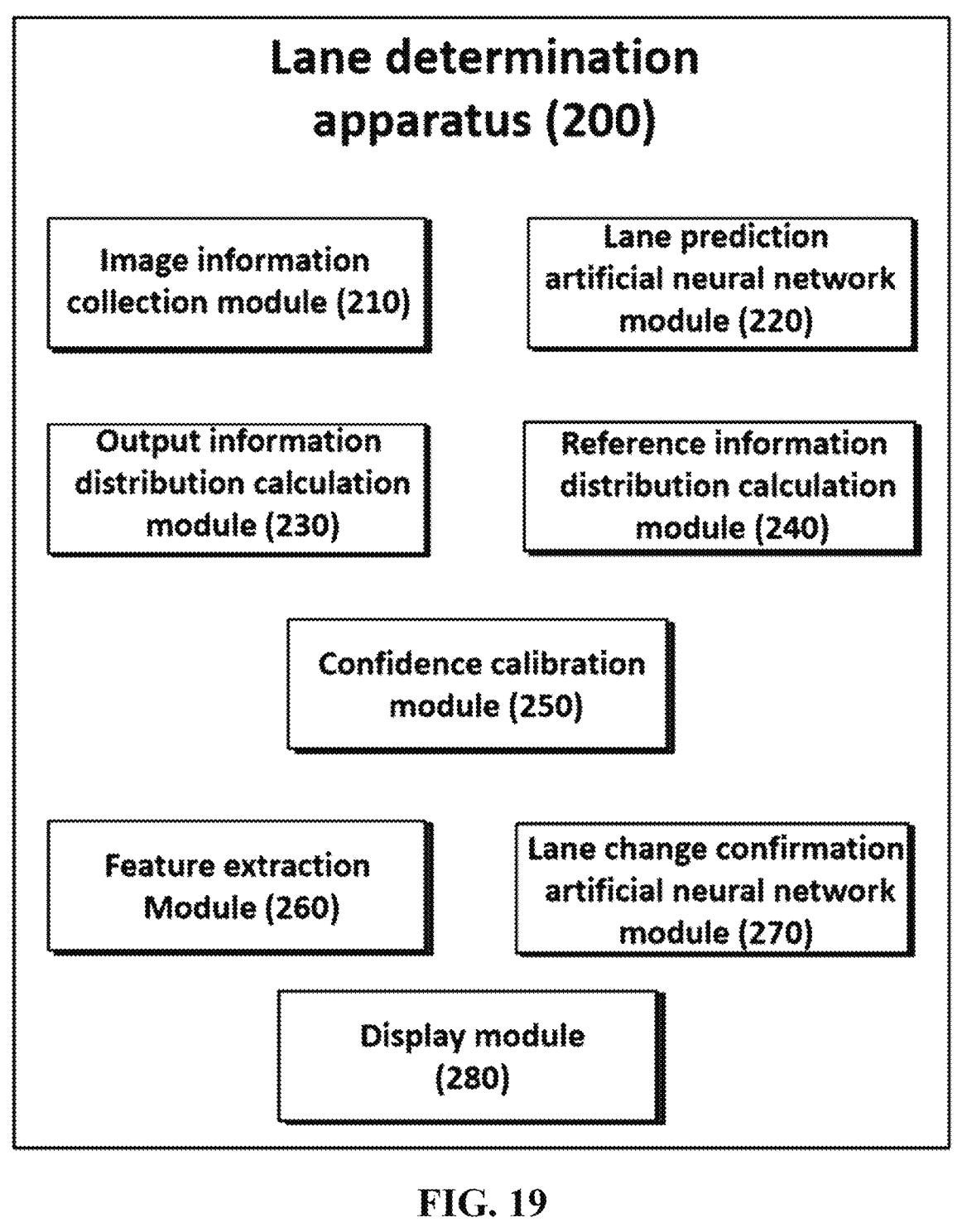

Lane determination apparatus (200)

Image information collection module (210)

Lane prediction artificial neural network module (220)

Output information distribution calculation module (230)

Reference information distribution calculation module (240)

Confidence calibration module (250)

Feature extraction Module (260)

Lane change confirmation artificial neural network module (270)

Display module (280)

FIG. 19

METHOD AND DEVICE FOR DETERMINING LANE OF TRAVELING VEHICLE BY USING ARTIFICIAL NEURAL NETWORK, AND NAVIGATION DEVICE INCLUDING SAME

CROSS REFERENCE TO RELATED APPLICATION(S)

This application is a National Stage of International Application No. PCT/KR2021/012169 filed Sep. 7, 2021, claiming priority based on Korean Patent Application No. 10-2020-0114794 filed Sep. 8, 2020.

TECHNICAL FIELD

The present invention relates to a method and apparatus for determining a lane of a driven vehicle using an artificial neural network and a navigation device including the same, and more specifically, to a technology for providing lane prediction information on the number of the lane in which a vehicle is currently traveling by utilizing an artificial neural network based on the information about the driving images of a vehicle, and confidence information therefor.

BACKGROUND

In general, a navigation device used in a vehicle searches for driving routes to a destination using map information when a user inputs the destination, and guides the vehicle along a driving route selected by the user. In addition, the navigation device provides guidance for the user to arrive at the destination by visually or audibly providing various information such as driving routes to the destination, terrain features located around the driving routes, a road congestion level, and so on.

In order to provide accurate driving information to the driver of a vehicle using a navigation device, it is necessary to know the position where the vehicle is currently traveling, specifically, the lane prediction information on the number of the lane in which the vehicle is currently traveling, so as to be able to provide accurate guidance to the driver of the vehicle. In particular, if turning points, such as an intersection, or an interchange (IC) where a roadway meets a highway and a junction (JC) where one highway meets another, are included on the driving route, it is necessary to notify the driver of a vehicle with information on whether to keep the lane or change lanes in a timely manner in order to prevent an accident in advance that might be caused by a sudden lane change.

However, since the current position of a vehicle is determined based on GPS in the case of a navigation device according to the prior art, there was a problem that it is difficult to accurately obtain lane prediction information for a currently driven vehicle. Accordingly, the reality is that the use of a navigation device is limited to vehicle guidance or to simply providing driving information.

Moreover, in order for autonomous driving to be stable, the information on the lane currently being used for driving must be accurate for stable proceeding of a lane change, entrance to an intersection, or the like; however, the reality is that there is no technology so far that can accurately determine information on the currently driven lane, and thus, the stability of autonomous driving has not been secured yet.

Furthermore, in order to create a map for autonomous driving, information on how many lines are on each road in total and in which line out of what total number of lines the vehicle is currently traveling must be included; however, since it was not possible to automatically extract information on lines by looking at road images in the case of the prior art, there was a problem that manufacturers had to manually label them.

SUMMARY OF INVENTION

Technical Objects

Therefore, a method and apparatus for determining a lane of a driven vehicle using an artificial neural network and a navigation device including the same in accordance with an embodiment are an invention devised to solve the problems described above, and it is an object to provide lane prediction information about a currently driven vehicle more accurately by using an artificial neural network.

More specifically, it is an object to adjust the confidence for an actual artificial neural network model to be close to the actual results and to thereby increase the reliability of the artificial neural network module that carry outs lane prediction, by performing lane prediction utilizing the artificial neural network module based on the information of inputted vehicle driving images, and then performing calibration on the artificial neural network module based on prediction information and reference information.

Furthermore, there exists an object to be able to be provided with information on the current lane more accurately in terms of the driver of a vehicle, and at the same time, to provide various guidance services of a navigation device by utilizing lane prediction information and confidence information therefor in terms of a program developer, by providing information on a vehicle being currently driven and confidence information therefor together.

In addition, there exists an object for an apparatus for determining a lane of a driven vehicle using an artificial neural network in accordance with an embodiment to automatically extract information on lines based on driving images, thereby making it possible to readily create a map including line information.

An embodiment provides a lane determination apparatus for a driven vehicle using an artificial neural network comprising an image information collection module configured to acquire driving image information of a vehicle from at least one camera module installed in the vehicle, a pre-trained lane prediction artificial neural network module, with the driving image information as input information and with lane prediction information of the vehicle and confidence information for the lane prediction information as output information, an output information distribution calculation module configured to calculate a data distribution map of the output information to thereby generate a first data distribution map, a reference information distribution calculation module configured to collect reference information for actual traveling lane prediction information of the vehicle, to calculate a data distribution map of the reference information, and to thereby generate a second data distribution map and a confidence calibration module configured to update parameters of the artificial neural network module so as to reduce a difference between the first data distribution map and the second data distribution map based on the second data distribution map.

The confidence calibration module may update the parameters of the artificial neural network module by using a method of dividing a logic vector by a single scalar parameter for all classes of the artificial neural network module.

The confidence calibration module may perform training on the single scalar parameter by using a calibration validation set identical to a validation set of the artificial neural network module.

The confidence calibration module may perform the training on the single scalar parameter such that a negative log-likelihood (NLL) value in the calibration validation set is minimized.

The lane prediction information may comprise lane information on the number of a lane in which the vehicle is currently traveling based on a first line or a last line of a road on which the vehicle is traveling.

The artificial neural network module may comprise a first output layer and a second output layer and the first output layer may output first lane information, which is information on the number of a lane in which the vehicle is currently traveling based on a first line of a road on which the vehicle is traveling, and a confidence value for the first lane information, and the second output layer may output second lane information, which is information on the number of a lane in which the vehicle is currently traveling based on a last line of the road on which the vehicle is traveling, and a confidence value for the second lane information.

The lane prediction information may comprise an exception class that is a separate class, and the lane prediction artificial neural network module may perform training with training data labeled with the exception class for points where lane division is not clear.

An embodiment provides a lane determination method using a pre-trained lane prediction artificial neural network module with driving image information as input information and with lane prediction information of a vehicle and confidence information for the lane prediction information as output information, the lane determination method for a driven vehicle using an artificial neural network may comprise an image information collection step for acquiring driving image information of the vehicle from at least one camera module installed in the vehicle, an output information distribution calculation step for calculating a data distribution map of the output information to thereby generate a first data distribution map, a reference information distribution calculation step for collecting reference information for actual traveling lane prediction information of the vehicle, calculating a data distribution map of the reference information, and thereby generating a second data distribution map and a step for updating parameters of the artificial neural network module so as to reduce a difference between the first data distribution map and the second data distribution map based on the second data distribution map.

An embodiment provides a navigation device may comprise an image information collection module configured to acquire driving image information of a vehicle from at least one camera module installed in the vehicle, a pre-trained lane prediction artificial neural network module, with the driving image information as input information and with lane prediction information of the vehicle and confidence information for the lane prediction information as output information, an output information distribution calculation module configured to calculate a data distribution map of the output information to thereby generate a first data distribution map, a reference information distribution calculation module configured to collect reference information for actual traveling lane prediction information of the vehicle, to calculate a data distribution map of the reference information, and to thereby generate a second data distribution map, a confidence calibration module configured to update parameters of the artificial neural network module so as to reduce a difference between the first data distribution map and the second data distribution map based on the second data distribution map and a display module configured to display externally the output information outputted from the artificial neural network module and driving images of the vehicle together.

Effects of the Invention

The method and apparatus for determining a lane of a driven vehicle using an artificial neural network and the navigation device including the same in accordance with an embodiment result in an effect that the confidence information outputted from the artificial neural network module approaches the actual probability for the lane prediction information by performing calibration in a method of updating the parameters of the artificial neural network module based on the result inferred by the artificial neural network module and reference information.

In addition, since the method and apparatus for determining a lane of a driven vehicle using an artificial neural network and the navigation device including the same in accordance with an embodiment can provide more reliable prediction information about the lane, there is an effect of more stably changing lanes and driving in autonomous driving.

Moreover, since the navigation device including the apparatus for determining a lane of a driven vehicle using an artificial neural network in accordance with an embodiment can present more accurate guidance to a driver in areas where an accident is highly likely to occur, such as changing lanes or entering a turning zone based on more reliable lane prediction information, there is an effect of allowing the driver to stably drive.

Furthermore, since the method and apparatus for determining a lane of a driven vehicle using an artificial neural network in accordance with an embodiment can accurately extract line information of a road being driven on based on a vehicle driving image, there is an effect of being able to easily produce a map including line information without manually inputting information about lines in producing a map.

BRIEF DESCRIPTION OF THE DRAWINGS

FIG. 1 is a block diagram showing some components of a lane determination apparatus 100 using an artificial neural network in accordance with an embodiment of the present invention.

FIGS. 7A, 7B and 8A through 8C are diagrams for illustrating the effects when calibration has been performed by the confidence calibration module.

FIG. 19 is a block diagram showing some components of a navigation device 200 in accordance with an embodiment of the present invention.

DETAILED DESCRIPTION OF EMBODIMENTS

Figure 2:
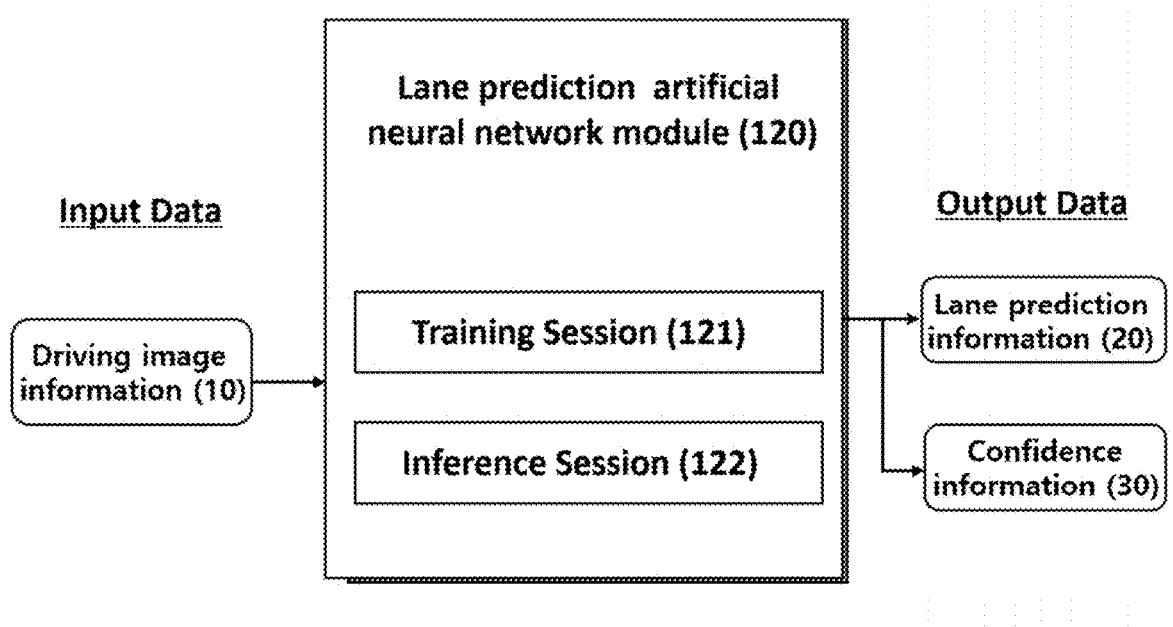
FIG. 2 is a diagram showing input information inputted to and output information outputted from a lane prediction artificial neural network module in accordance with an embodiment.

Hereinafter, embodiments according to the present invention will be described with reference to the accompanying drawings. In adding reference numerals to constituent elements of each drawing, it should be noted that the same constituent elements are denoted by the same reference numeral even if they are illustrated on different drawings. In describing the embodiments of the present invention, a detailed description of pertinent known constructions or functions will be omitted if it is deemed to make the gist of the embodiments the present invention unnecessarily vague. In addition, the embodiments of the present invention will be described below, but the technical idea of the present invention is not limited thereto or is not restricted thereto, and may be variously realized by being modified by those skilled in the art.

In addition, terms used in the present specification are used only in order to describe embodiments rather than limiting or restricting the present invention. Singular forms are intended to include plural forms unless the context clearly indicates otherwise.

In the present specification, it should be understood that the term "include", "comprise", or "have" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

In addition, throughout the specification, when it is described that an element is "connected" to another element, this includes not only being "directly connected", but also being "indirectly connected" with another element in between, and terms including ordinal numbers such as first, second, and the like used in the present specification will be used only to describe various elements, and are not to be interpreted as limiting these elements.

The present invention will be described more fully hereinafter with reference to the accompanying drawings, in which embodiments of the invention are shown. In the drawings, parts irrelevant to the description are omitted in order to clearly describe the present invention.

FIG. 1 is a block diagram showing some components of a lane determination apparatus 100 using an artificial neural network in accordance with an embodiment of the present invention, and FIG. 2 is a diagram showing input information inputted to and output information outputted from a lane prediction artificial neural network module 120 in accordance with an embodiment. In the following, the lane determination apparatus 100 using an artificial neural network will be described by being referred to as a lane determination apparatus 100 for the convenience of description.

Referring to FIG. 1, the lane determination apparatus 100 may include an image information collection module 110, a lane prediction artificial neural network module 120, an output information distribution calculation module 130, a reference information distribution calculation module 140, a confidence calibration module 150, a feature extraction module 160, a lane change confirmation artificial neural network module 170, and the like.

The image information collection module 110 may collect driving image information of the front and sides of a vehicle captured via at least one camera mounted on the vehicle, and transmit the collected images to the lane prediction artificial neural network module 120.

The lane prediction artificial neural network module 120 is an artificial neural network module that uses the driving image information 10 of the vehicle collected by the image information collection module 110 as input information, and lane prediction information 20 inferred on the number of the lane in which the vehicle is currently traveling and confidence information 30 on the inferred lane as output information, and the lane prediction artificial neural network module 120 may include a training session 121 for performing training based on the input information and output information, and an inference session 122 for inferring output information based on the input information.

The training session 121 of the lane prediction artificial neural network module 120 is a session capable of performing training based on the input information 10 and the output information 30 and 40, and the inference session 122 may analyze the driving image information 10 inputted in real-time using the trained lane prediction artificial neural network module 120, and output the lane prediction information 20 inferred on the number of the lane in which the vehicle is currently traveling and the confidence information 30 therefor together.

For example, when an image is inputted to the lane prediction artificial neural network module 120 and if it is determined that the traveling lane is the number 1 lane as a result of analyzing the inputted image and inferring the lane for the currently driven vehicle, the number 1 lane may be outputted as the lane prediction information 20 and, at the same time, confidence information 30 (e.g., 0.8) with which the number 1 lane has been determined may be outputted as output information.

In addition, the lane prediction information 20 outputted from the lane prediction artificial neural network module 120 may be outputted as information on the number of a lane specifically based on a particular line. For example, lane information on the number of the lane in which the vehicle is currently traveling based on the first line of the road may be outputted, or conversely, lane information on the number of the lane in which the vehicle is currently traveling based on the last line of the road may be outputted.

In providing lane information, if information on the number of a lane based on a particular line is provided as in the present invention, since a driver can recognize the number of his/her lane based on the reference line closer to the vehicle, there is an effect of preparing for a lane change and changing lanes more stably when changing lanes according to the driving route.

Figure 3:
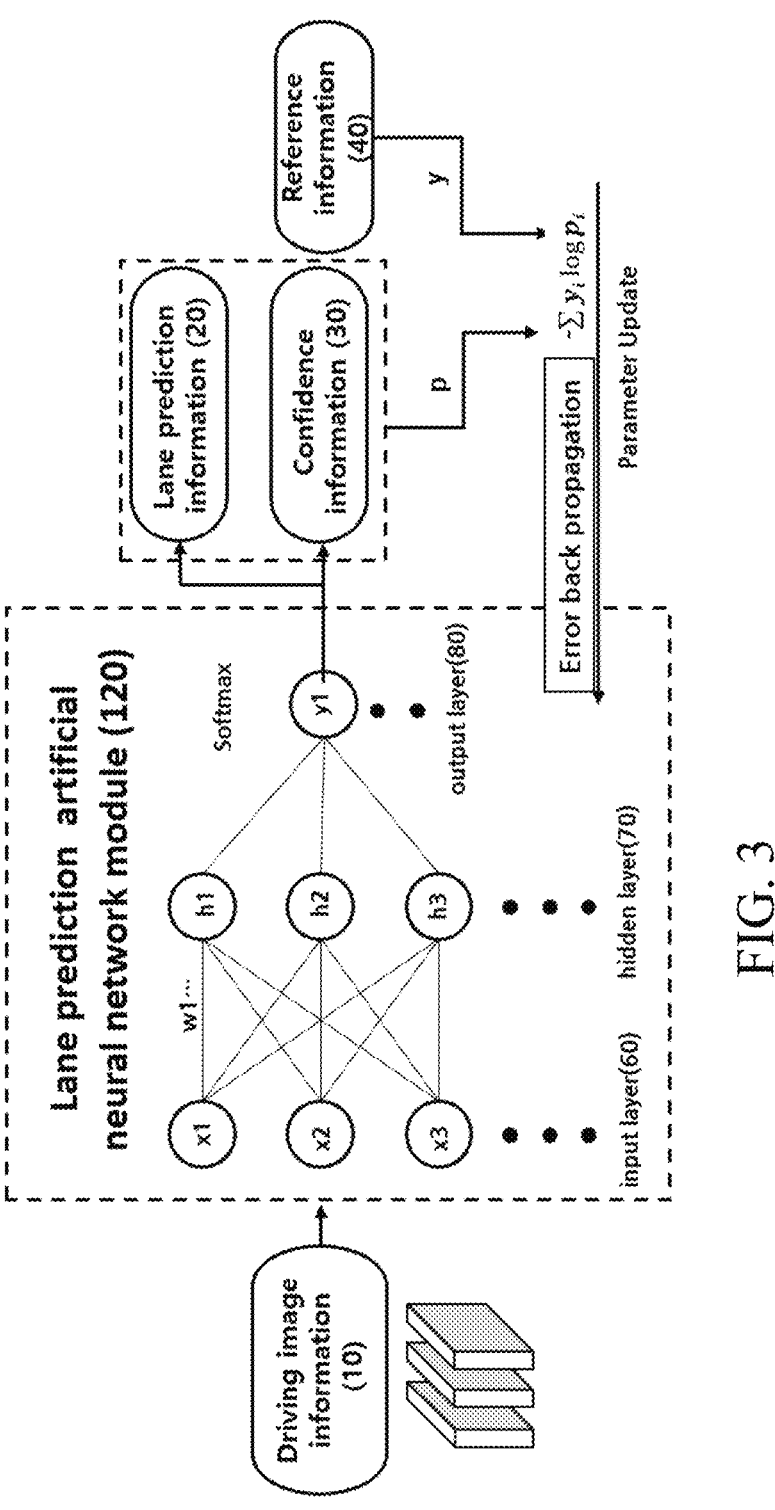
FIG. 3 is a diagram showing the structure of an artificial neural network module applied to the present invention.
Figure 4:
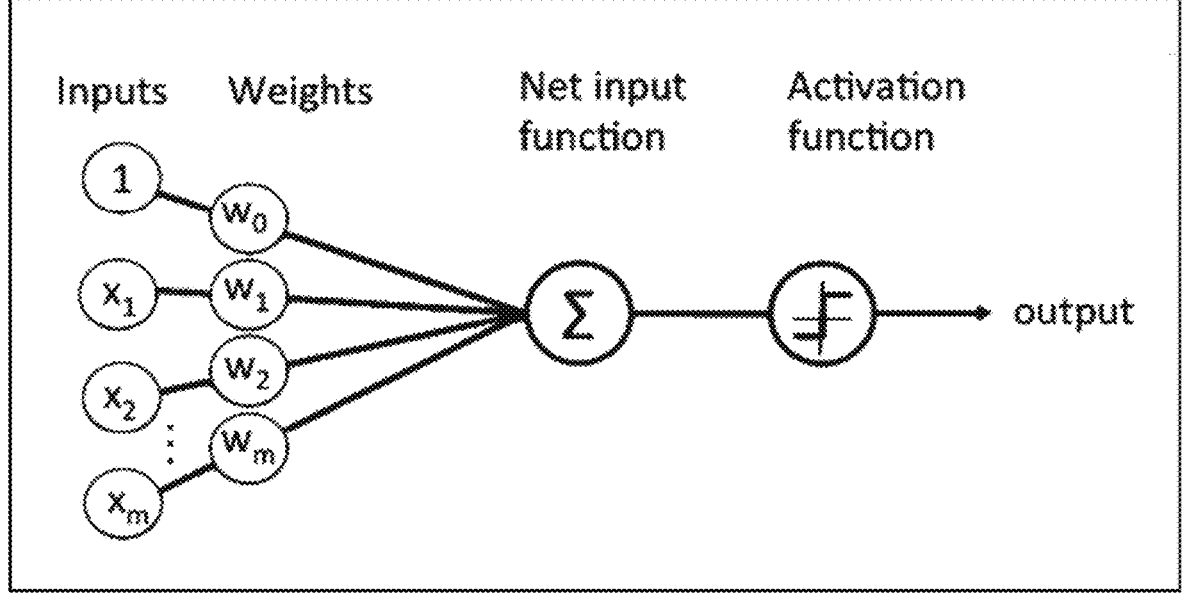
FIG. 4 is a schematic diagram illustrating a calculation process at nodes of the artificial neural network module.

FIG. 3 is a diagram showing the structure of an artificial neural network module applied to the present invention, and FIG. 4 is a schematic diagram illustrating a calculation process at nodes of the artificial neural network module.

Referring to FIG. 3, a multi-layer neural network model of the lane prediction artificial neural network module 120 may comprise an input layer 60, a hidden layer 70, and an output layer 80.

The input layer 60 consists of nodes corresponding to each input argument, and the number of nodes is equal to the number of input arguments. The hidden layer 70 may serve to process linear combinations of argument values passed from the input layer 60 into a non-linear function such as a sigmoid function and forward it to the output layer or another hidden layer. Although FIG. 3 shows that the lane prediction artificial neural network module 120 has one hidden layer 70 due to the limitation of the page, the present invention is not limited thereto and the lane prediction artificial neural network module 120 may include a plurality of hidden layers 70. The output layer 80 is a node corresponding to an output argument, and in a classification model, as many output nodes as the number of classes may be generated. In the present invention, since the output information consists of the lane prediction information 20 on the number of the lane in which the vehicle is currently traveling and confidence information 30 therefor, the output layer 80 is shown with one layer as shown in FIG. 3. However, the present invention is not limited thereto, and may comprise a plurality of output layers 80 depending on the utilization environment of the lane prediction artificial neural network module 120.

As shown in FIG. 4, when the input information 10 is inputted to the lane prediction artificial neural network module 120, operations occur actually at each node, and operation processes in the lane prediction artificial neural network module 120 are mathematically designed to simulate processes occurring in the neurons constituting a human neural network.

A node responds when it receives a stimulus of a certain magnitude or higher, and the magnitude of its response is approximately proportional to the value obtained by multiplying an input value by a parameter (or a weight) of the node, excluding the bias value. In general, a node receives multiple inputs and has as many parameters as the number of inputs. Therefore, by adjusting these parameters, different weights may be assigned to different inputs. Finally, all the multiplied values are added up, and its sum goes into the input of an activation function, which is the output layer 80. The result of the activation function corresponds to the output of the node, and this output value will eventually be used for classification or regression analysis.

Each layer of the neural network model consists of at least one node, and whether each node is activated/deactivated is determined according to the input value. The input information becomes the input to a first layer (input layer), and after that, the output of each layer, in turn, becomes the input to the next layer. All coefficients continue to change little by little over the course of a training process, which, as a result, reflects which input each node treats importantly. And the 'training' of the artificial neural network model described above refers to a process of updating these coefficients.

Figure 5:
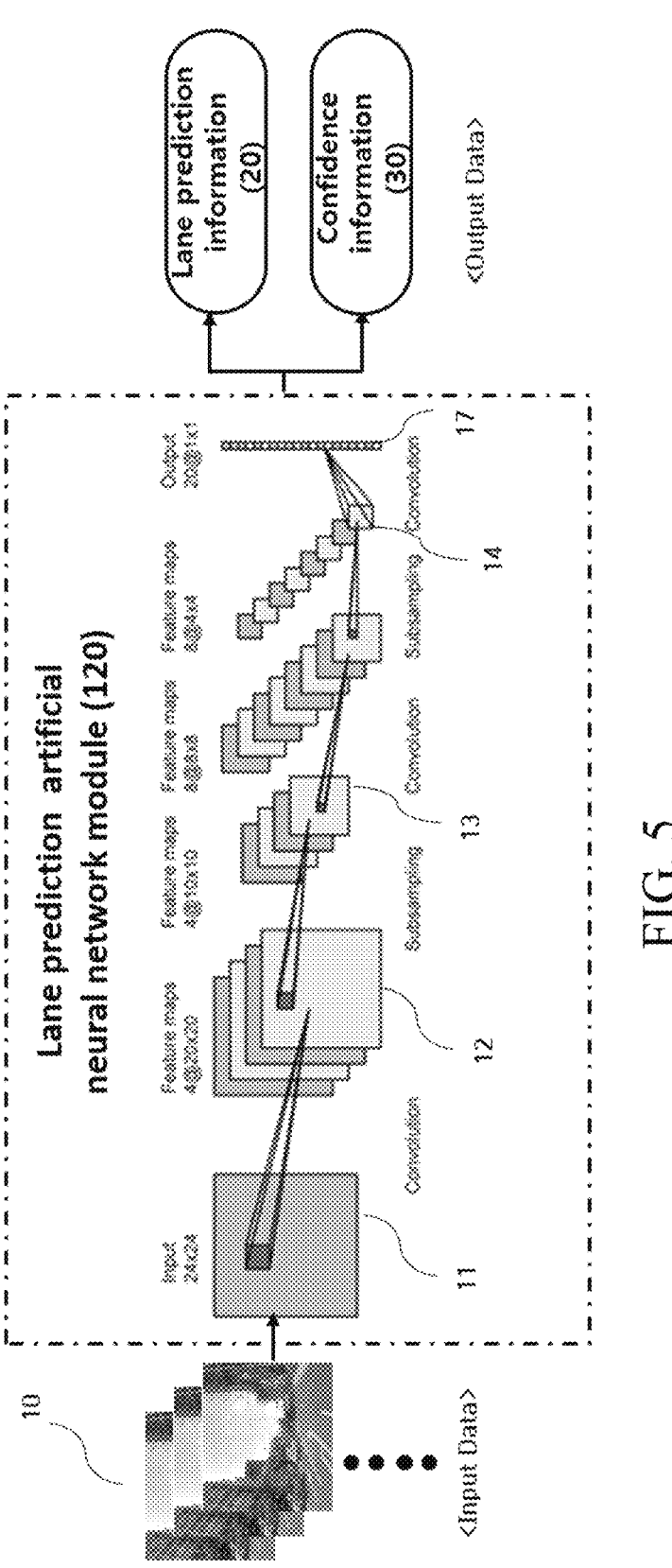
FIG. 5 is a diagram for illustrating a process in which input information inputted to CNN is converted into output information according to an embodiment of the present invention

In the following, the structure of a CNN network typically applied to the lane prediction artificial neural network module 120 of the present invention will be described with reference to FIG. 5. FIG. 5 is a diagram for illustrating a process in which input information inputted to CNN is converted into output information according to an embodiment of the present invention.

A convolutional neural network (CNN) is a type of feed-forward deep neural network (DNN) used to analyze visual images, and refers to a neural network consisting of one or more convolutional layers, pooling layers, and fully connected layers. In Korean, it is referred to as a convolutional neural network. CNN has a structure suitable for training with two-dimensional data, and can be trained through a backpropagation algorithm.

The CNN process can obtain a global feature that can represent the entire image from local features while largely repeating feature extraction, impact minimization, and classification tasks.

With this applied to the present invention and described with reference to FIG. 5, when images collected by the image collection module 110 are inputted as the input information 10 of the lane prediction artificial neural network module 120, the lane prediction artificial neural network module 120 applies a filter to the inputted images 11 and generates a first feature map 12. By applying a filter means performing a convolution operation on images using a filter having a particular coefficient.

The lane prediction artificial neural network module 120 generates a first feature map 12 by a particular filter, and, once the first feature map 12 is generated, reduces the size of the images by applying subsampling to the first feature map 12. After the subsampling process, a second feature map 13 having local features is generated. And, the lane prediction artificial neural network module 120 repeatedly performs processes of applying a filter having different characteristics to the second feature map 13 again and then subsampling it. By performing these processes continuously and repeatedly, a final feature map 14 having a global feature can be finally generated. The final feature map 14 thus obtained is connected to the input of a fully connected network 17, and output information can be generated through the output layer. In the case of the present invention, the lane prediction artificial neural network module 120 generates the final feature map for the inputted images 11 in the method described above, the final feature map is connected to the input of the fully connected network 17, and the lane prediction information 20 and confidence information 30 therefor, which is the final output information, may be outputted through the activation function of the output layer 80.

As described previously, because CNN significantly reduces the number of variables by repeatedly applying filters with the same coefficients to the entire images, there is an effect of being able to obtain invariance independent of topology changes, and such an effect has an effect of improving accuracy in determining a lane based on inputted images as in the present invention.

In addition, although a description has been provided in this specification based on CNN as a neural network applied to the lane prediction artificial neural network module 120 of the present invention, the neural network structure applied to the lane prediction artificial neural network module 120 of the present invention is not limited to CNN, and various known artificial neural network models such as Google Mobile Net v2, VGGNet16, and ResNet50 useful for detecting images may be applied.

Figure 6:
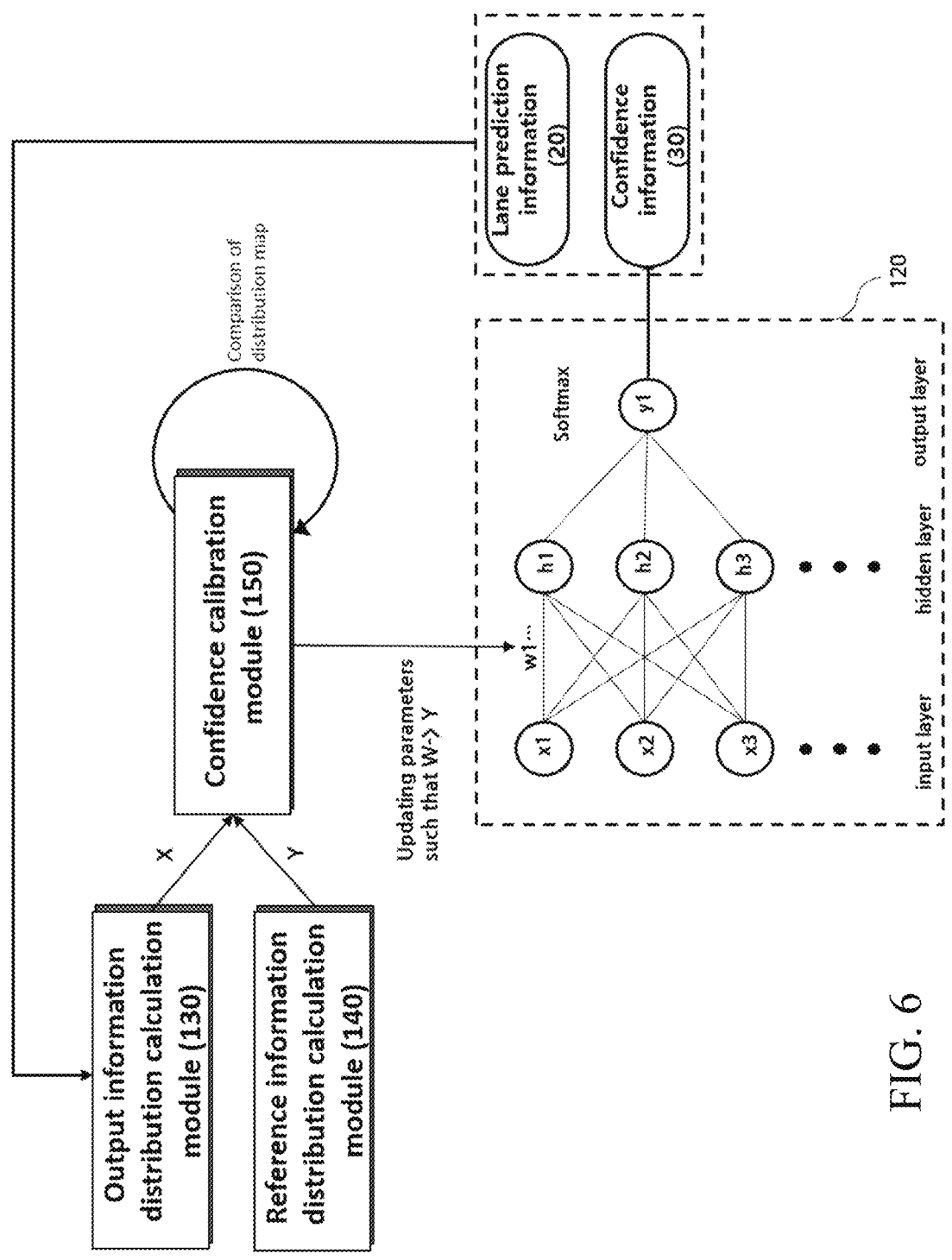
FIG. 6 is a diagram showing a relationship between an artificial neural network module and each component according to an embodiment of the present invention.
Figure 8A:
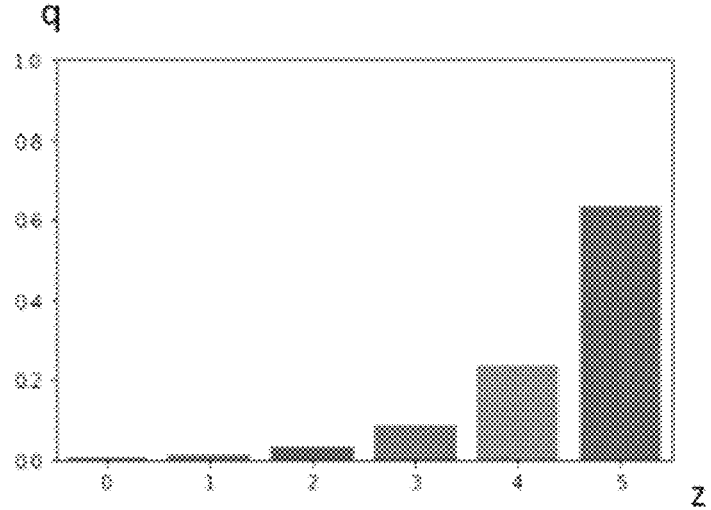
Figure 8B:
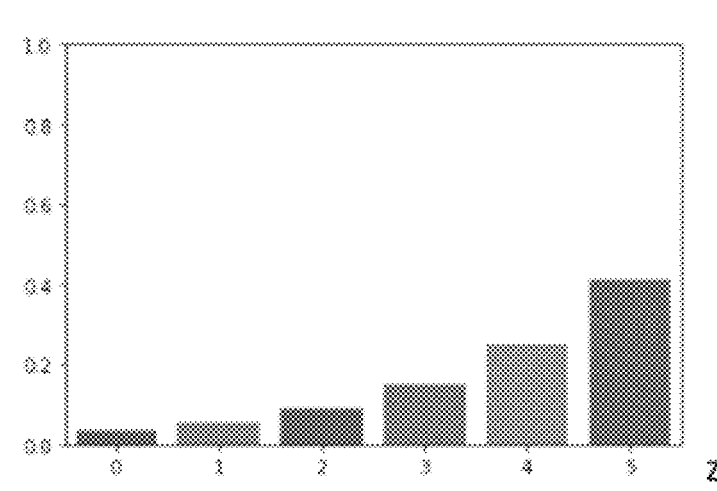
Figure 8C:
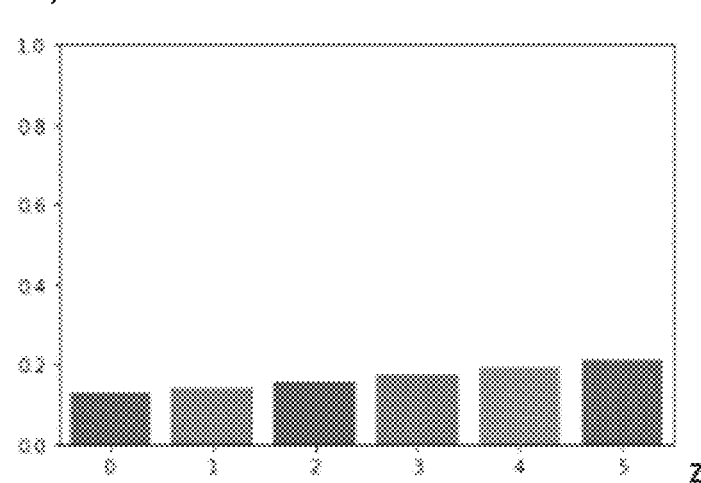

FIG. 6 is a diagram showing a relationship between an artificial neural network module and each component according to an embodiment of the present invention, and specifically, is a diagram illustrating a process in which parameters of the artificial neural network module are updated by training.

Referring to FIG. 6, the lane prediction information 20 and the confidence information 30 therefor outputted by the lane prediction artificial neural network module 120 may be inputted to the output information distribution calculation module 130. The output information distribution calculation module 130 is a module that specifically calculates a data distribution map for the lane prediction information 20 and the confidence information 30 therefor outputted from the lane prediction artificial neural network module 120.

For example, if the lane prediction artificial neural network module 120 has outputted, through inference, the lane prediction information 20 respectively on the number of the lane in which the vehicle is traveling and the confidence information 30 therefor based on one hundred (100) images inputted, the output information distribution calculation module 130 may receive the lane prediction information 20 and the confidence information 30 outputted by the lane prediction artificial neural network module 120, and then analyze a distribution map for the received information based thereon and generate a first data distribution map X. The first data distribution map X refers to information on what values the output information outputted by inferring for each image inputted to the lane prediction artificial neural network module 120 are distributed.

The reference information distribution calculation module 140 may collect reference information on actual traveling lane prediction information of the vehicle, calculate a data distribution map of the reference information, and thereby generate a second data distribution map Y.

The reference information is information that may serve as a reference in updating the parameters of the artificial neural network module, and is also called ground truth information. In the present invention, actual lane information for images inputted to the lane prediction artificial neural network module 120 may be included in the reference information.

The confidence calibration module 150 may perform calibration of changing various parameter values of the artificial neural network model so that the output value of the artificial neural network model reflects actual confidence. For example, if the output of a model for the output information B of input information A is 0.9, calibration may be performed to change various parameter values of the artificial neural network model so as to have a meaning that it will be B with a probability of 90%.

In calibrating the model of the lane prediction artificial neural network module 120, the confidence calibration module 150 may receive the first data distribution map X from the output information distribution calculation module 130, receive the second data distribution map Y from the reference information distribution calculation module 140, and perform calibration in the way of updating the parameters of the lane prediction artificial neural network module 120 so that the difference between the first data distribution map X and the second data distribution map Y is reduced based on the second data distribution map Y.

In the description of an embodiment in relation to lane prediction, if the lane prediction information inferred by the lane prediction artificial neural network module 120 for each of the one hundred (100) inputted images is that the ratio of prediction of being the number 1 lane is 20%, the ratio of prediction of being the number 2 lane is 50%, and the ratio of prediction of being the number 3 lane is 30%, and the ratio of the number 1 lane is 30%, the ratio of the number 2 lane is 45%, and the ratio of the number 3 lane is 25% based on the reference information, then the confidence calibration module 150 may update the parameters of the lane prediction artificial neural network module 120 to match the ratios of the actual reference information.

According to this, there occurs an effect that the confidence information 30 outputted from the lane prediction artificial neural network module 120 approaches the actual probability for the lane prediction information 20.

Further, as an embodiment, the confidence calibration module 150 may perform calibration in the way of softening the softmax function corresponding to the output layer, and specifically, calibration may be performed by transforming the logic vector Z as shown in Eq. 1 below using a single scalar parameter T in a multi-classification problem situation with K labels.

$$\hat{q}_i = \max_k \sigma_{softmax}\left(z_i/T\right)^{(k)} \qquad \text{(Eq. 1)}$$

Here, $\hat{q}$ denotes a calibrated probability, and Eq. 3 above means that calibration is performed by dividing a logic vector by a single scalar parameter T in a multi-classification problem with K labels.

If T, which is a single scalar parameter, is 1 in Eq. 3, it becomes the original equation for solving for confidence using the softmax, and as T increases, the final q converges to 1/K, and as T approaches 0, q approaches 1.

In addition, the optimal value for the single scalar parameter T may be determined by training, and specifically, training may be performed on the single scalar parameter T by using a calibration validation set, which is another validation set having the same characteristics as the validation set of the lane prediction artificial neural network module 120.

Specifically, the confidence calibration module 150 may perform training on the single scalar parameter T such that the negative log-likelihood (NLL) value in the calibration validation set is minimized by using the calibration validation set. If calibration is performed in this way, the single scalar parameter T may be calibrated without changing the maximum value of the output of the softmax. Therefore, since such a method only affects the calibration of conventional models and does not affect the accuracy, there exists an advantage that it can also be applied to artificial neural network modules that were trained previously.

FIGS. 7A, 7B and 8A through 8C are diagrams for illustrating the effects when calibration has been performed by the confidence calibration module, and FIG. 7A is a program code of a general softmax function, FIG. 7B is a code that has performed calibration when described before the softmax function, and FIG. 8 is an illustration showing graphs for the probability P values calculated when T=0

(FIG. 8A), T=2 (FIG. 8B), and T=10 (FIG. 8C) are applied for the single scalar parameter T according to FIG. 7B.

Figure 10:
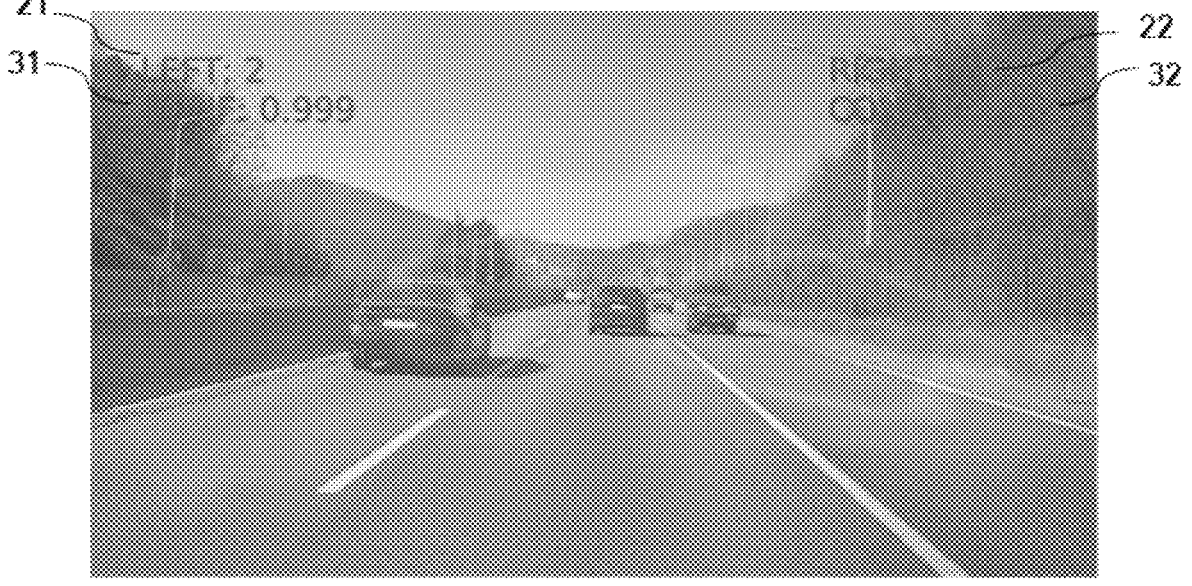
FIG. 10 is an illustration showing a state in which the information outputted according to the artificial neural network of FIG. 9 is displayed on a display module of a navigation device.

When T is gradually increased from 0, it can be confirmed that the value of the difference between the respective probability values is reduced, as shown in FIG. 10. However, since the order does not change, it does not affect the accuracy. Therefore, if calibration is performed according to the confidence calibration module of the present invention, there is an effect of improving the reliability of the lane prediction artificial neural network module 120 without affecting the accuracy.

Figure 9:
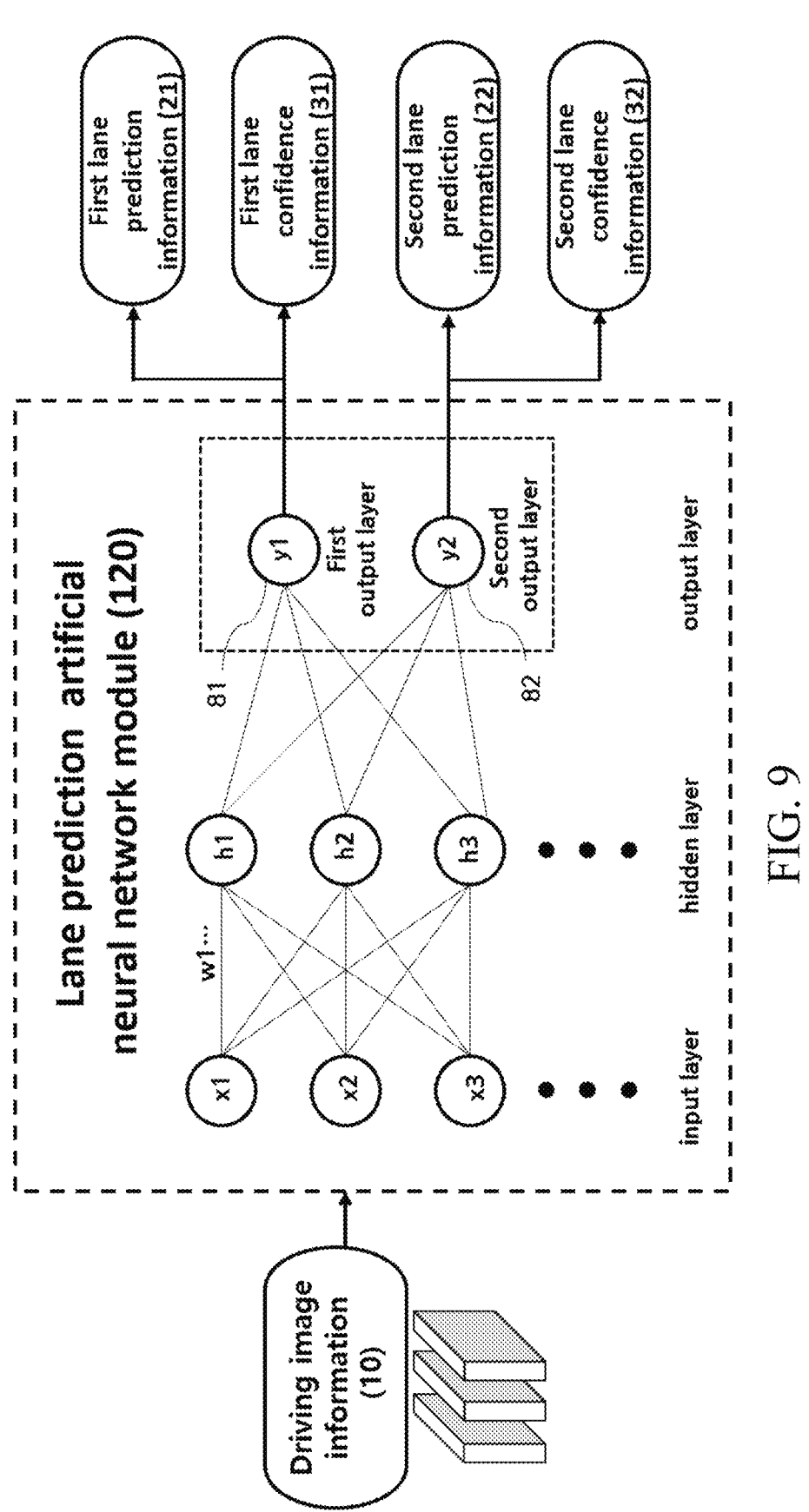
FIG. 9 is a diagram for illustrating another embodiment of the output layer of the present invention.

FIG. 9 is a diagram for illustrating another embodiment of the output layer of the present invention, and FIG. 10 is an illustration showing a state in which the information outputted according to the artificial neural network of FIG. 9 is displayed on a display module of a navigation device.

Referring to FIG. 9, the input information inputted to the lane prediction artificial neural network module 120 of the present invention is driving image information 10, which is the same as in FIG. 3, but the output layer is not of a single layer but may include a first output layer 81 and a second output layer 82.

The first output layer 81 and the second output layer 82 serve as activation functions, and typically a softmax function, a cross-entropy function, or the like may be used. In the following, a description will be provided based on the softmax function for the convenience of description.

As shown in FIG. 9, if the lane prediction artificial neural network module 120 of the present invention uses a first softmax function and a second softmax function for the output layer 80, the first softmax function may output first lane prediction information 21 on the number of the lane in which the vehicle currently driven is traveling based on the first line and first lane confidence information 31 therefor, and the second softmax function may output second lane prediction information 22 on the number of the lane in which the vehicle currently driven is traveling based on the last line, and second lane confidence information 32 therefor.

Accordingly, for the output information of the first softmax function, the first lane prediction information 21 determined as the second lane based on the first line and the first lane confidence information 31 therefor may be outputted as the second lane and 0.999, respectively, and for the output information of the second softmax function, the second lane prediction information 22 determined as the second lane based on the last line and the confidence information 32 therefor may be outputted as the second lane and 0.994, respectively, as shown in FIG. 10.

In general, there will be no big problem if all lines of a road can be captured with a front camera installed in a vehicle; however, there are cases where a front camera cannot cover all lanes depending on the functions of a camera. Accordingly, if one softmax function is used in such cases, there will be a problem of being unable to provide accurate lane information because information on the total number of lanes in a road cannot be extracted. However, if classification is done using two softmax functions on a single network as in the present invention, there is an effect that more accurate lane information can be provided since the information on the entire lanes will be known.

In addition, if line information for a road can be extracted for driving images as in the present invention, there is an effect that a map including line information can be readily produced. That is, since it was not possible to automatically extract line information by looking at road images in the case of the prior art, there was a problem that manufacturers had to manually label them, whereas because the method and apparatus for determining a lane of a driven vehicle using an artificial neural network in accordance with an embodiment can automatically extract information on lines based on driving images as described above, there is an effect of being able to produce a map including line information more easily. Accordingly, there is an effect that a map for autonomous driving, which requires accurate knowledge of line information, can also be produced more accurately than in the prior art.

Figure 11A:
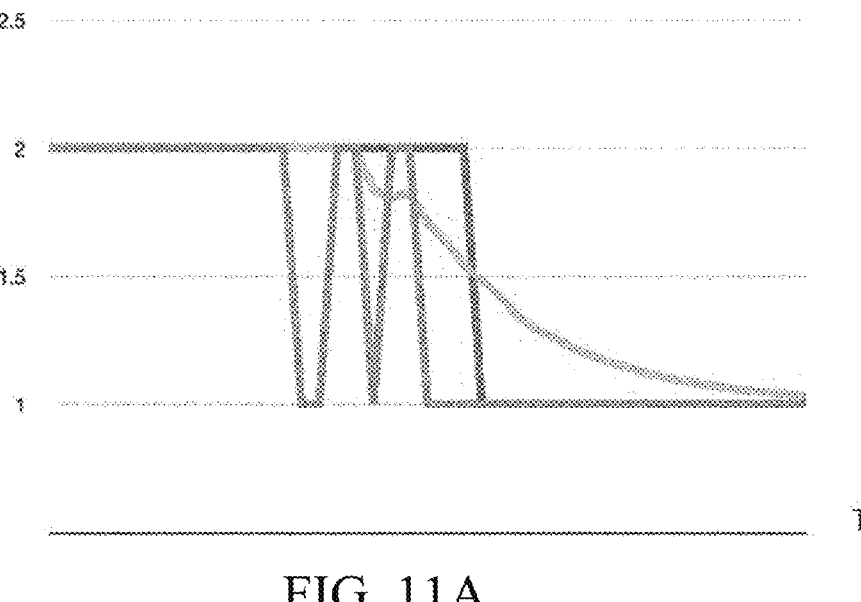
FIGS. 11A and 11B are illustrations for describing a method of calculating final lane prediction information based on the lane prediction information and confidence information therefor outputted by the lane prediction artificial neural network module, according to another embodiment of the present invention.
Figure 11B:
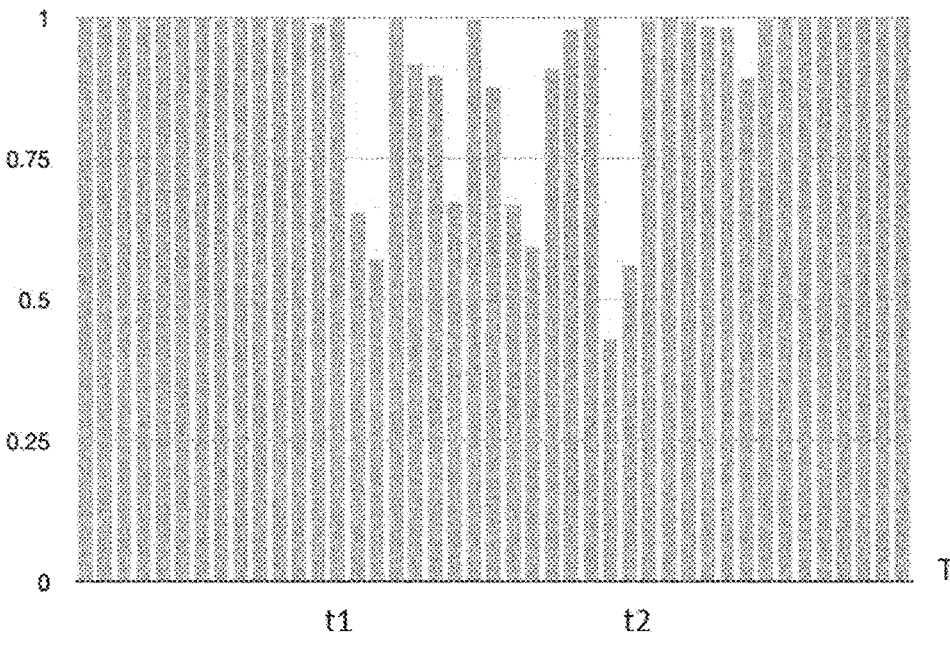

FIGS. 11A and 11B are illustrations for describing a method of calculating final lane prediction information based on the lane prediction information and confidence information therefor outputted by the lane prediction artificial neural network module, according to another embodiment of the present invention.

Specifically, the blue line in FIG. 11A is an illustration showing lane prediction information predicted over time in real-time, and FIG. 11B is an illustration on which confidence information for the predicted lane information over time is outputted.

Referring to FIGS. 11A and 11B, the confidence for the lane prediction information is 1 from time 0 to t1, and the lane prediction information is outputted as the second lane. As the confidence is 1, there is little change in the lane, the blue line in FIG. 11A.

However, looking at FIG. 11B, it can be seen that there is a large change in the confidence information between t1 and t2, which is a phenomenon that occurs because the lane is changing. Accordingly, it can be seen that the blue line in FIG. 11A continues to change from the second lane to the first lane. Therefore, in such a case, the present invention may remove values of a certain level of confidence or lower, select only meaningful confidence values, and thereby derive the green line in FIG. 11A, and the red line can be derived through a final correction operation, providing the result therefor. If confidence information does not exist, it is necessary to proceed with manual work in correcting result values for the confidence that changes in real-time and calculating the final data; however, the present invention can derive results such as the red line according to a reference set in advance automatically using the confidence information.

Figure 12:
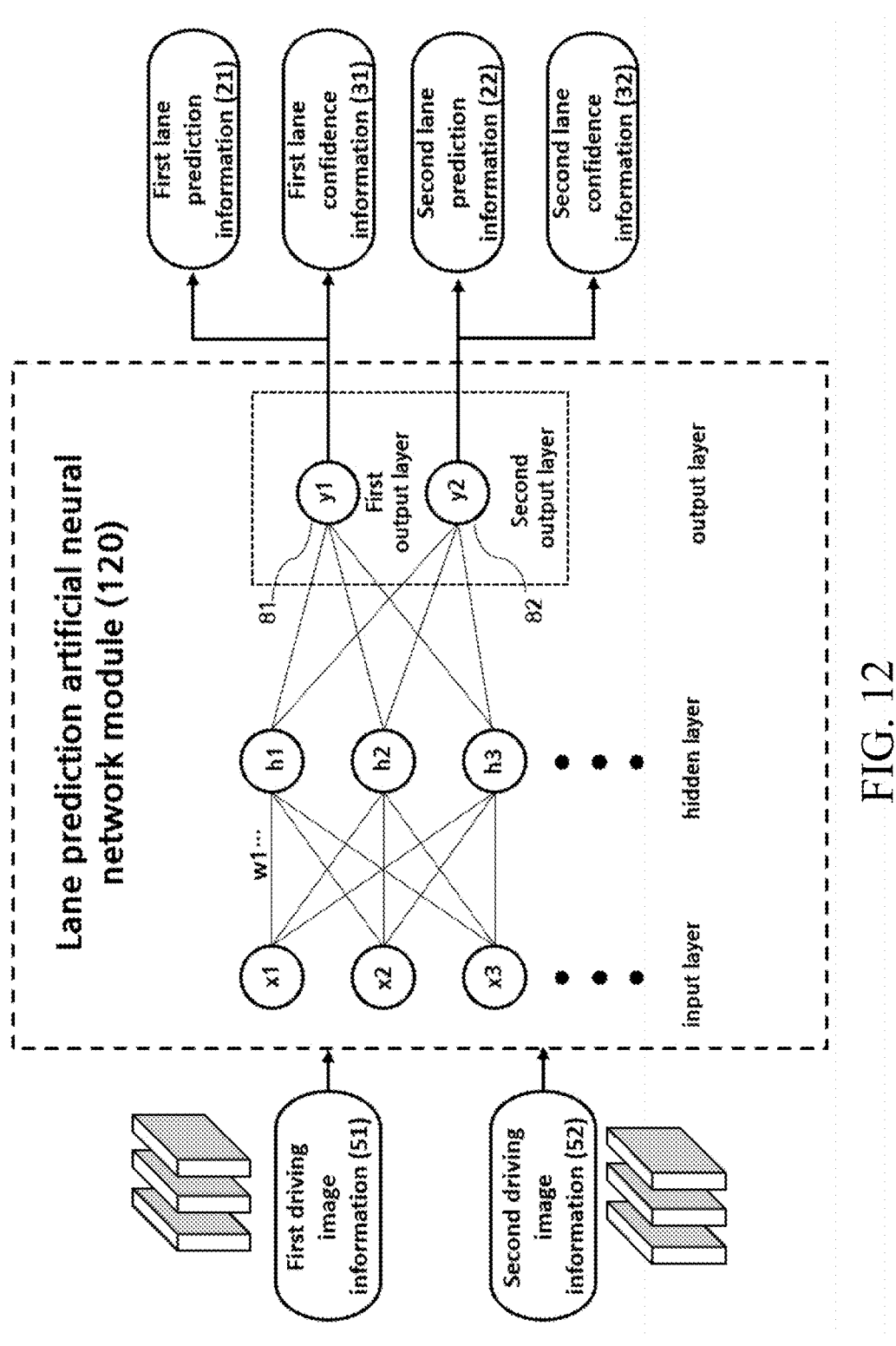
FIG. 12 is a diagram illustrating input information inputted to and output information from an artificial neural network module according to another embodiment.

FIG. 12 is a diagram illustrating input information inputted to and output information from an artificial neural network module according to another embodiment.

A lane prediction artificial neural network module 120 shown in FIG. 12 has the same basic structure as the lane prediction artificial neural network module 120 described in FIG. 9, but the driving image information as input information in the case of FIG. 9 is information received from one camera, whereas first driving image information 10 and second driving image information 50 acquired by two cameras may be inputted to the lane prediction artificial neural network module 120 as input information in FIG. 12. In this case, the first output layer 81 may output first lane prediction information 21 and first lane confidence information 31 trained based on the first driving image information 10, the second output layer 82 may output second lane prediction information 22 and second lane confidence information 32 trained based on the second driving image information 50, and here, the second lane may refer to the last line of the road.

In addition, the lane prediction information 20 of the lane prediction artificial neural network module 120 in accordance with an embodiment of the present invention may be configured to further include class information for lanes as well as exception class information.

Figure 13A:
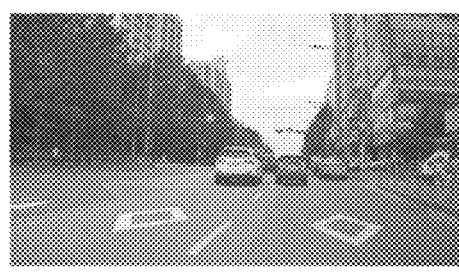
FIG. 13A through 13F are views showing examples in which a class is classified as 0 according to an embodiment of the present invention.
Figure 13D:
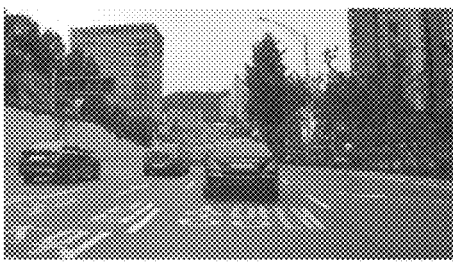
Figure 13B:
Figure 13E:
Figure 13C:
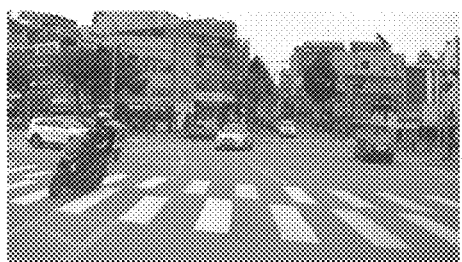
Figure 13F:
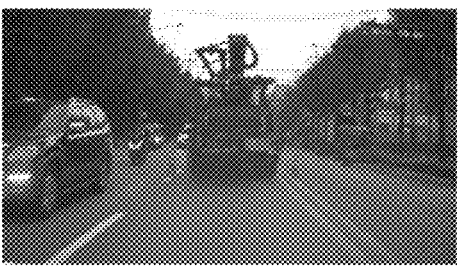

The exception class information is class information classified for points where lane division is not clear on the road, and refers to points at which it is difficult to accurately infer information on a lane with the driving image information 10 only. FIG. 13A through 13F are views showing examples in which a class is classified as 0 according to an embodiment of the present invention, and as shown in FIG. 13A a lane-varying point, FIG. 13B an obstacle-present point, FIG. 13C an intersection point, FIG. 13D a lane merging point, FIG. 13E a lane expansion point, FIG. 13F a construction point, etc., may correspond thereto.

Accordingly, the lane prediction artificial neural network module 120 in accordance with an embodiment may perform training and inference by utilizing the exception class. Specifically, the training session of the lane prediction artificial neural network module 120 may perform supervised training based on information on the exception class labeled separately, and output the lane information as output information when the training is completed. The exception class may also be called a miscellaneous class or a zero (0) class due to its characteristics.

Points classified as an exception class are points where it is difficult to accurately extract information on lanes with driving image information 10 only, and these points are greatly diverse in the number of cases due to the nature of lanes. However, since the amount of data used for performing training on these is relatively small, it is not only difficult to perform training at each point where lane division is not clear but also the efficiency is lowered.

However, if a point where lane division is not clear is classified into an exception class defined separately as in the lane prediction artificial neural network module 120 in accordance with an embodiment, and then training is performed based on the remaining classes, the training is performed based only on data having relatively accurate information, and thus, there is an advantage of improving the reliability of the lane prediction artificial neural network module 120. Specific embodiments regarding this will be described with reference to FIGS. 14A, 14B, 15A, 15B, 16A and 16B.

FIGS. 14A, 14B, 15A, 15B, 16A and 16B are views showing a comparison between the output result of the lane prediction artificial neural network module 120 that does not include the exception class information and the output result of the neural network module 120 including the exception class information.

Figure 14A:
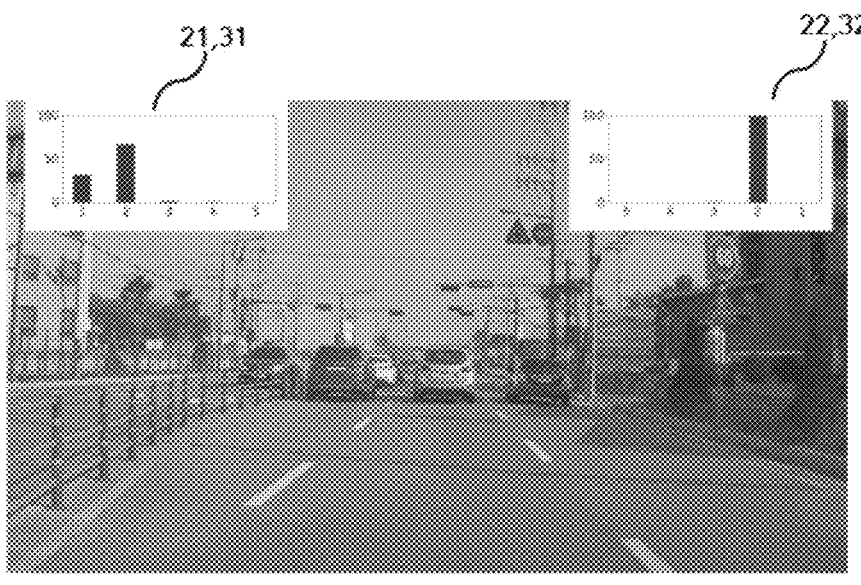
FIGS. 14A, 14B, 15A, 15B, 16A and 16B are views showing a comparison between the output result of the lane prediction artificial neural network module that does not include the exception class information and the output result of the neural network module including the exception class information
Figure 14B:

Specifically, FIG. 14A is a view showing the output information of the lane prediction artificial neural network module 120 that does not include the exception class information at a lane expansion point, and FIG. 14B is a view showing the output information of the lane prediction artificial neural network module 120 including the exception class information at the lane expansion point.

Referring to FIG. 14A, since the expansion of a new lane occurs at the leftmost point, if the lane prediction artificial neural network module 120 infers the lane without including the exception class, the first lane prediction information 21 and the first lane confidence information 31 therefor will bring about a result that cannot accurately determine the information on the lane, as shown in FIG. 14A.

However, since the lane prediction artificial neural network module 120 including the exception class information as shown in FIG. 14B classifies the lane expansion point into the exception class and infers the lane, the first lane prediction information 21 and the first lane confidence information 31 may be outputted as a separate class value of 0 at the lane expansion point as shown in FIG. 14B. According to this, there is an effect of being able to prevent a result in which the inferred lane is confused.

Figure 15A:
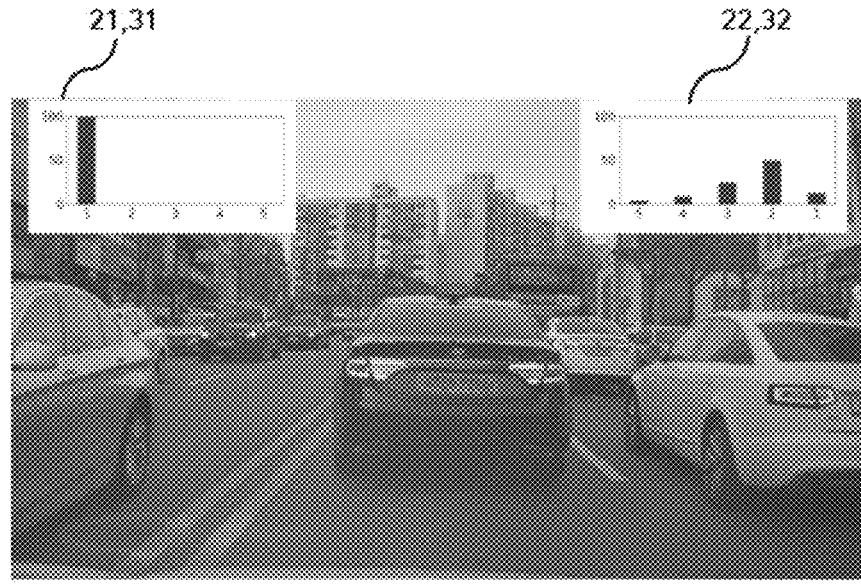
Figure 15B:
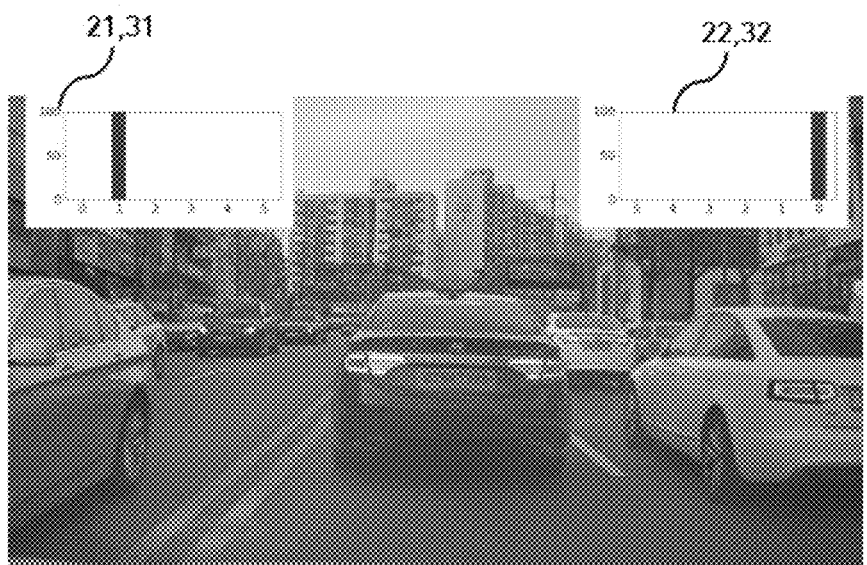
Figure 16A:
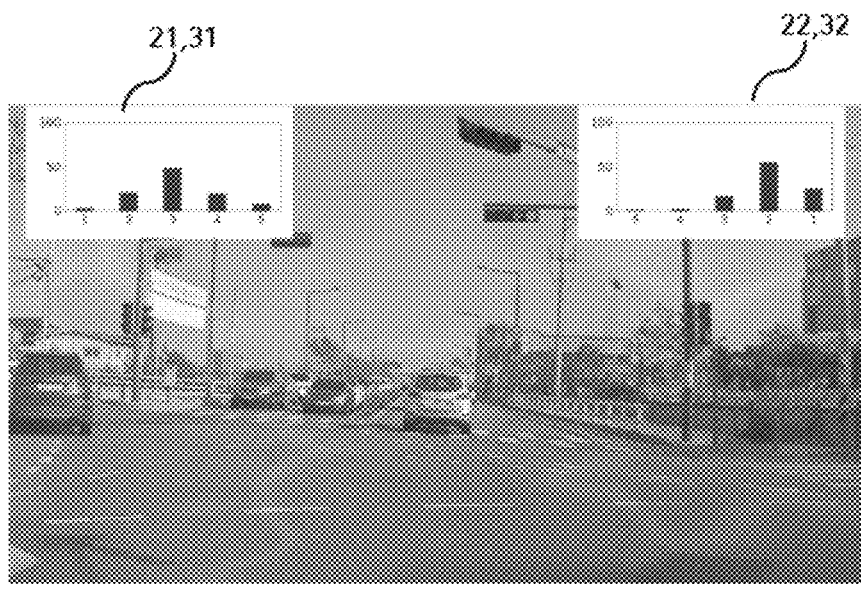
Figure 16B:
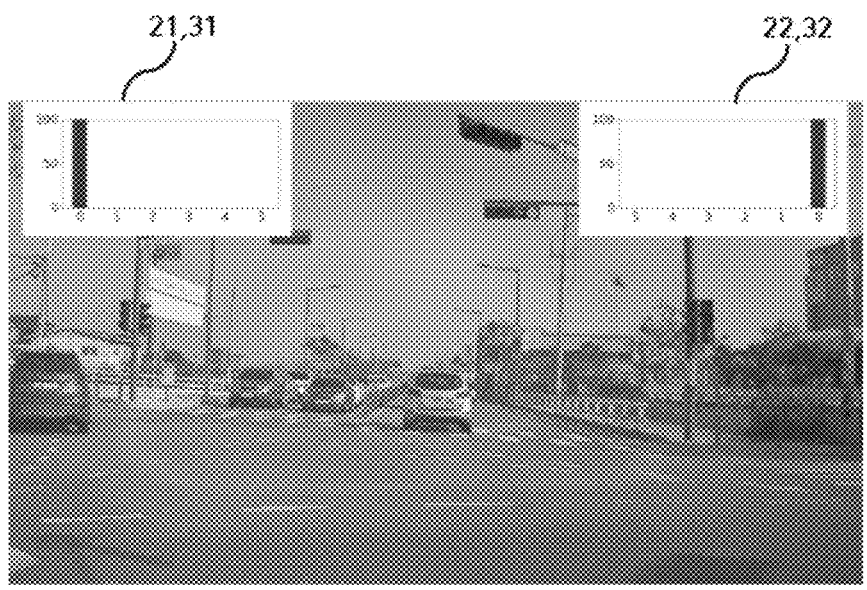

Next, FIG. 15A is a view showing the output information of the lane prediction artificial neural network module 120 that does not include the exception class information at an obstacle-present point, FIG. 15B is a view showing the output information of the lane prediction artificial neural network module 120 including the exception class information at the obstacle-present point, FIG. 15A is a view showing the output information of the lane prediction artificial neural network module 120 that does not include the exception class information at an intersection point, and FIG. 15B is a view showing the output information of the lane prediction artificial neural network module 120 including the exception class information at the obstacle-present point.

Also in FIGS. 15A, 15B, 16A and 16B as with FIGS. 14A and 14B, if a lane is inferred by utilizing the exception class information, the accuracy of lane inference is reduced for points where lane division cannot be clearly made, but if the point where lane division is not clear is classified into the exception class and then the lane is predicted based on the remaining data, there is an advantage that the information on the lane can be inferred more accurately.

Moreover, as another embodiment of the present invention, the lane prediction information 20 of the lane prediction artificial neural network module 120 may be configured to further include not only class information on lanes but also a plurality of pieces of exception class information.

The plurality of pieces of exception class information is class information obtained by dividing the exception class information described above into a plurality of pieces based on certain criteria, and as an example, the lane-varying point may be classified into a first exception class, the lane merging point into a second exception class, the obstacle-present point into a third exception class, the lane expansion point into a fourth exception class, the intersection point into a fifth exception class, and the construction point into a sixth exception class, then training may be performed for each class, and the lane prediction information 20 of the lane prediction artificial neural network module 120 may be configured to further include the first to sixth exception class information described above. Therefore, since the lane prediction artificial neural network module 120 in accordance with an embodiment of the present invention can output not only simply lane information but also output separate information for points that are difficult to distinguish between lanes, there is an effect of providing more diverse and accurate information in producing a map including lane information or guiding lanes.

Figure 17:
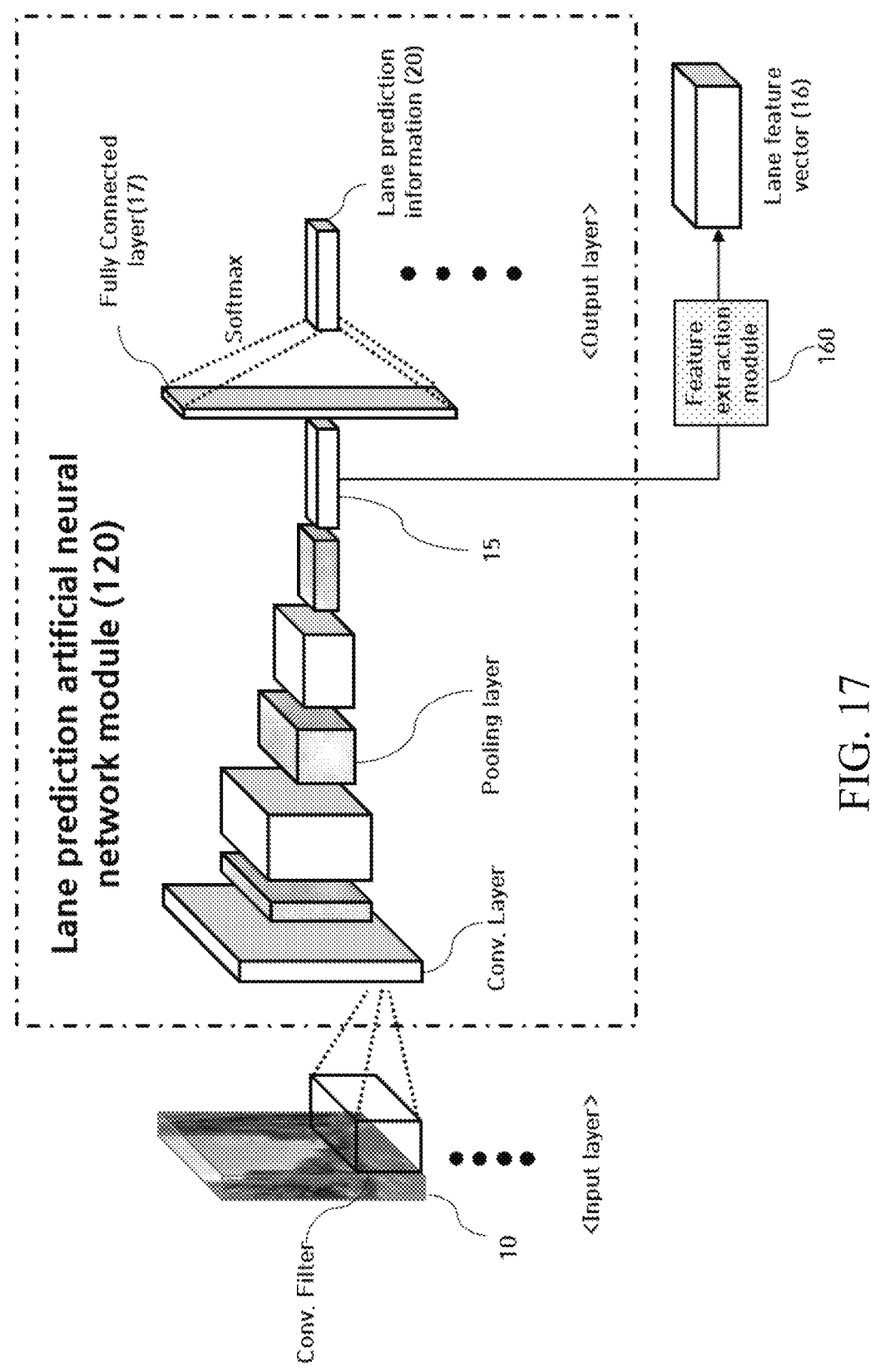
FIG. 17 is a diagram for illustrating a method of extracting a lane feature vector in the lane prediction artificial neural network module in accordance with an embodiment
Figure 18:
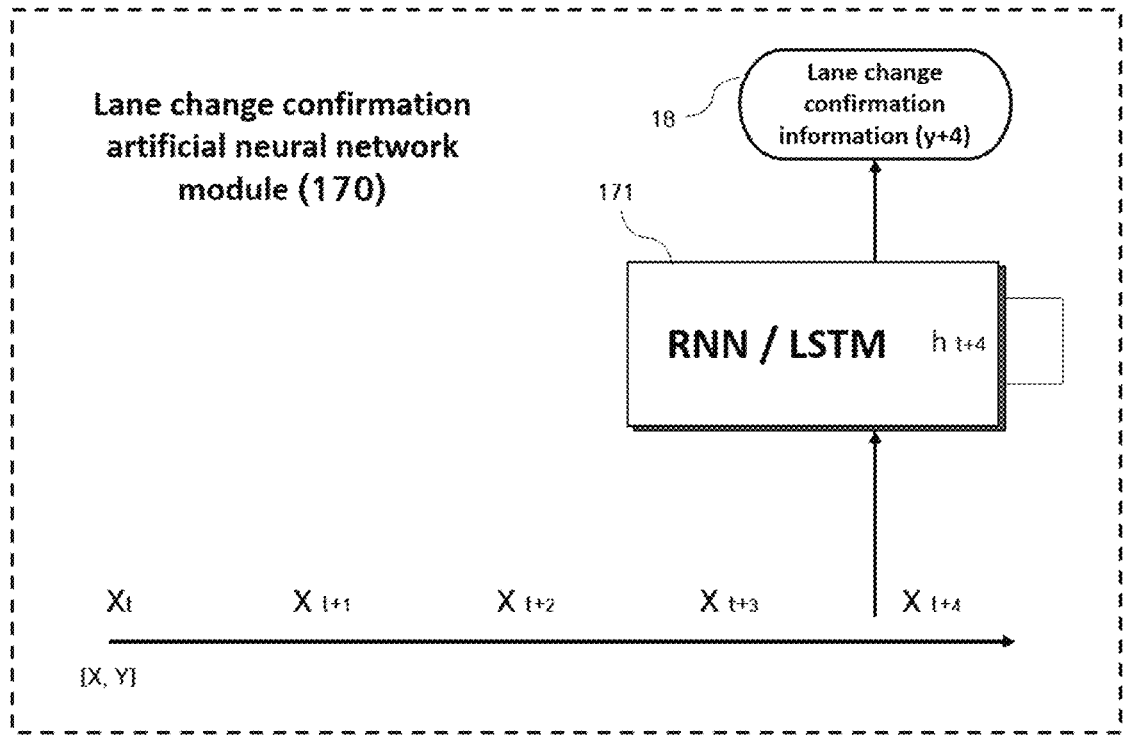
FIG. 18 is a diagram illustrating a lane change confirmation artificial neural network module in accordance with an embodiment.

FIG. 17 is a diagram for illustrating a method of extracting a lane feature vector in the lane prediction artificial neural network module in accordance with an embodiment, and FIG. 18 is a diagram illustrating a lane change confirmation artificial neural network module in accordance with an embodiment.

The lane prediction artificial neural network module 120 of FIG. 17 is the same as the lane prediction artificial neural network module 120 described above, and a feature extraction module 160 is a module that uses a lane feature vector 16 as output information with respect to the driving image information 10 inputted to the lane prediction artificial neural network module 120. Specifically, the feature extraction module 162 is a module that outputs a vector outputted from a layer 15 before the fully connected layer 17 and the output layer as the lane feature vector 16 for the driving image information 10 inputted, in a pre-trained image classification artificial neural network including ConvNet.

According to an embodiment of the present invention, the feature extraction module 160 may be configured to output an n-dimensional vector obtained by applying average pooling (avg_pooling) to the result of extracting a feature in the last stage of a convolution layer of a pre-trained image classification artificial neural network as the lane feature vector 61 for the driving image information 10 inputted.

As shown in FIG. 18, the lane change confirmation artificial neural network module 170 in accordance with an embodiment of the present invention may be configured with a recurrent neural network (RNN) or an LSTM (long-short term memory) type recurrent neural network that uses a lane feature vector as input data xt and lane change confirmation information yt as output data.

In this case, the input data may consist of a lane feature vector 16 (xt, xt+1, xt+2, . . . ) after a lane change start time t, which is after the lane change is confirmed by the lane prediction artificial neural network module 120. In the inference session of the lane change confirmation artificial neural network module 170 in accordance with an embodiment of the present invention, for the lane change confirmation information yt, yt+1, yt+2, . . . , which is the output data outputted through hidden layers ht, ht+1, ht+2, . . . using the information of the lane feature vector 16 inputted sequentially from xt as input data, it may be configured such that the lane prediction information, which is the output information of the lane prediction artificial neural network module 120 when the confidence value of the lane change confirmation information 18 is greater than or equal to a particular value, is confirmed as the confirmed lane information.

In relation to the training session of the lane change confirmation artificial neural network module 170, it may be configured such that the lane feature vector 16 is used as input data and the lane change confirmation information 18 is used as output data, and the data on whether the actual lane has changed is used as the ground truth, and a loss function may be configured to allow the parameters of the lane change confirmation artificial neural network module 170 to be updated in a direction in which the difference between the output data and the ground truth is reduced.

For example, if the lane change is confirmed based on the fact that the lane prediction information at the time t−1 before the lane change was the first lane and the lane prediction information at the lane change start time t has changed to the second lane, the lane feature vector xt, xt+1, xt+2, . . . after the lane change start time is inputted as the input data to the lane change confirmation artificial neural network module 170.

Thereafter, the lane change confirmation artificial neural network module 170 will sequentially output lane change confirmation information together with confidence (yt='lane change, 0.4', yt+1='lane change, 0.8', . . . ), and the lane prediction information outputted from the lane prediction artificial neural network module 120 at a time when the lane change confirmation information with a certain level of confidence or higher is outputted is confirmed and outputted as the confirmed lane information ('second lane').

According to the lane change confirmation artificial neural network module 170 in accordance with an embodiment of the present invention, there is an effect that when the lane prediction information, which is the output information of the lane prediction artificial neural network module 120, is outputted while being switched repeatedly to different lanes in the process of changing the lane due to the lane change by the user, it is possible to confirm the time when the actual lane change is made. According to this, when operating a lane-based navigation service or autonomous driving service, it is possible to confirm the time of lane change, thereby providing an effect of enabling a precise navigation service or precise autonomous driving service.

FIG. 19 is a block diagram showing some components of a navigation device 200 in accordance with an embodiment of the present invention.

Referring to FIG. 19, the navigation device 200 may include an image information collection module 210, a lane prediction artificial neural network module 220, an output information distribution calculation module 230, a reference information distribution calculation module 240, a confidence calibration module 250, a feature extraction module 260, a lane change confirmation artificial neural network module 270, a display module 280, and the like. The components except for the display module 280 in FIG. 19 carry out the same function as the respective components described in FIG. 1, and thus, a detailed description thereof will be omitted.

The display module 280 may not only display the lane prediction information 20 and the confidence information 30 therefor outputted by the lane prediction artificial neural network module 120, but also display the information implemented by processing the output information, like a service that guides the driving route of a vehicle.

Therefore, the display module 280 may include various display panels, such as a liquid crystal display (LCD) panel, a light-emitting diode (LED) panel, or an organic light-emitting diode (OLED) panel. On the other hand, if the display includes a graphical user interface (GUI) such as a touchpad or the like, that is, a device that is software, it may serve as an input unit for receiving user input.

So far, a method and apparatus for determining a lane of a driven vehicle using an artificial neural network according to the embodiment have been described in detail.

The method and apparatus for determining a lane of a driven vehicle using an artificial neural network and the navigation device including the same in accordance with an embodiment result in an effect that the confidence information outputted from the artificial neural network module approaches the actual probability for the lane prediction information by performing calibration in a method of updating the parameters of the artificial neural network module based on the result inferred by the artificial neural network module and reference information.

In addition, since the method and apparatus for determining a lane of a driven vehicle using an artificial neural network and the navigation device including the same in accordance with an embodiment can provide more reliable prediction information about the lane, there is an effect of more stably changing lanes and driving in autonomous driving.

Moreover, since the navigation device including the apparatus for determining a lane of a driven vehicle using an artificial neural network in accordance with an embodiment can present more accurate guidance to a driver in areas where an accident is highly likely to occur, such as changing lanes or entering a turning zone based on more reliable lane prediction information, there is an effect of allowing the driver to stably drive.

Furthermore, since the method and apparatus for determining a lane of a driven vehicle using an artificial neural network in accordance with an embodiment can accurately extract line information of a road being driven on based on a vehicle driving image, there is an effect of being able to easily produce a map including line information without manually inputting information about lines in producing a map.

On the other hand, the constitutional elements, units, modules, components, and the like stated as "~part or portion" in the present invention may be implemented together or individually as logic devices interoperable while being individual. Descriptions of different features of modules, units or the like are intended to emphasize functional embodiments different from each other and do not necessarily mean that the embodiments should be realized by individual hardware or software components. Rather, the functions related to one or more modules or units may be performed by individual hardware or software components or integrated in common or individual hardware or software components.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof.

The processes and logic flows described in this specification can be performed by one or more programmable processors executing one or more computer programs to perform functions by operating on input data and generating output.

This written description sets forth the best mode of the present invention and provides examples to describe the present invention and to enable a person of ordinary skill in the art to make and use the present invention. This written description does not limit the present invention to the specific terms set forth.

While the present invention has been shown and described with reference to certain embodiments thereof, it will be understood by those skilled in the art that various changes in forms and details may be made therein without departing from the spirit and scope of the present invention as defined by the appended claims and their equivalents. Therefore, the technical scope of the present invention may be determined by on the technical scope of the accompanying claims.

What is claimed is:

1. A lane determination apparatus for a driven vehicle using an artificial neural network, comprising:

at least one processor including processing circuitry, memory storing instructions that, when executed by the at least one processor individually or collectively, cause the lane determination apparatus to:

acquire driving image information of a vehicle from at least one camera module installed in the vehicle, process the driving image information using a pre-trained lane prediction artificial neural network to output lane prediction information of the vehicle and confidence information for the lane prediction information, calculate a data distribution map of the output information to thereby generate a first data distribution map, wherein the first data distribution map indicates a ratio of predictions corresponding to each of a plurality of lanes among total predictions outputted by the artificial neural network based on the driving image information, collect reference information for actual traveling lane prediction information of the vehicle, calculate a data distribution map of the reference information, and thereby generate a second data distribution map, wherein the second data distribution map indicates a ratio of labels corresponding to each of the plurality of lanes among labels of the reference information corresponding to the driving image information, update parameters of the artificial neural network so as to reduce a difference between the first data distribution map and the second data distribution map based on the second data distribution map.

2. The lane determination apparatus of claim 1, wherein the instructions, when executed by the at least one processor individually or collectively, further cause the lane determination apparatus to update the parameters of the artificial neural network by using a method of dividing a logic vector by a single scalar parameter for all classes of the artificial neural network.

3. The lane determination apparatus of claim 2, wherein the instructions, when executed by the at least one processor individually or collectively, further cause the lane determination apparatus to perform training on the single scalar parameter by using a calibration validation set identical to a validation set of the artificial neural network.

4. The lane determination apparatus of claim 3, wherein the instructions, when executed by the at least one processor individually or collectively, further cause the lane determination apparatus to perform the training on the single scalar parameter such that a negative log-likelihood (NLL) value in the calibration validation set is minimized.

5. The lane determination apparatus of claim 1, characterized in that the lane prediction information comprises lane information on the number of a lane in which the vehicle is currently traveling based on a first line or a last line of a road on which the vehicle is traveling.

6. The lane determination apparatus of claim 1, characterized in that the artificial neural network comprises a first output layer and a second output layer, the first output layer outputs first lane information, which is information on the number of a lane in which the vehicle is currently traveling based on a first line of a road on which the vehicle is traveling, and a confidence value for the first lane information, and the second output layer outputs second lane information, which is information on the number of a lane in which the vehicle is currently traveling based on a last line of the road on which the vehicle is traveling, and a confidence value for the second lane information.

7. The lane determination apparatus of claim 1, characterized in that the lane prediction information comprises an exception class that is a separate class, and the pre-trained lane prediction artificial neural network is trained using training data labeled with the exception class for points where lane division is not clear.

8. A lane determination method using a pre-trained lane prediction artificial neural network with driving image information as input information and with lane prediction information of a vehicle and confidence information for the lane prediction information as output information, the lane determination method for a driven vehicle using an artificial neural network, comprising:

acquiring driving image information of the vehicle from at least one camera module installed in the vehicle;

calculating a data distribution map of the output information to thereby generate a first data distribution map, wherein the first data distribution map indicates a ratio of predictions corresponding to each of a plurality of lanes among total predictions outputted by the artificial neural network based on the driving image information;

collecting reference information for actual traveling lane prediction information of the vehicles;

calculating a data distribution map of the reference information, and thereby generating a second data distribution map, wherein the second data distribution map indicates a ratio of labels corresponding to each of the plurality of lanes among labels of the reference information corresponding to the driving image information; and updating parameters of the artificial neural network so as to reduce a difference between the first data distribution map and the second data distribution map based on the second data distribution map.

9. A navigation device comprising:

a display, at least one processor including processing circuitry, memory storing instructions that, when executed by the at least one processor individually or collectively, cause the navigation device to:

acquire driving image information of a vehicle from at least one camera module installed in the vehicle, process the driving image information using a pre-trained lane prediction artificial neural network to output lane prediction information of the vehicle and confidence information for the lane prediction information, calculate a data distribution map of the output information to thereby generate a first data distribution map, wherein the first data distribution map indicates a ratio of predictions corresponding to each of a plurality of lanes among total predictions outputted by the artificial neural network based on the driving image information, collect reference information for actual traveling lane prediction information of the vehicle, calculate a data distribution map of the reference information, and thereby generate a second data distribution map, wherein the second data distribution map indicates a ratio of labels corresponding to each of the plurality of lanes among labels of the reference information corresponding to the driving image information, update parameters of the artificial neural network so as to reduce a difference between the first data distribution map and the second data distribution map based on the second data distribution map, and control the display to display externally the output information outputted from the artificial neural network and driving images of the vehicle together.

* * * * *